United States Patent [19]
Donoho et al.

[11] Patent Number: 5,433,029
[45] Date of Patent: Jul. 18, 1995

[54] BIRD REPELLENT APPARATUS FOR WIRES AND THE LIKE

[76] Inventors: Bruce A. Donoho, 24362 Via Madrugada; Richard V. Wells, 27602 Tres Vistas, both of Mission Viejo, Calif. 92692

[21] Appl. No.: 216,488

[22] Filed: Mar. 22, 1994

[51] Int. Cl.⁶ .......................................... A01M 29/00
[52] U.S. Cl. ........................................ 43/1; 52/101; 256/11
[58] Field of Search .................... 43/1; 52/101; 256/11

[56] References Cited
U.S. PATENT DOCUMENTS

| | | | |
|---|---|---|---|
| 564,591 | 7/1896 | Clune et al. | 256/11 |
| 2,777,171 | 1/1957 | Burnside et al. | 52/101 |
| 3,282,000 | 11/1966 | Shaw et al. | 52/101 |
| 3,362,115 | 1/1968 | Nyhus et al. | 52/101 |
| 3,611,651 | 10/1971 | Carlson | 52/101 |

*Primary Examiner*—P. Austin Bradley
*Assistant Examiner*—Jeanne M. Elpel
*Attorney, Agent, or Firm*—Leonard Tachner

[57] ABSTRACT

A bird repellent apparatus which is specifically designed for installation on telephone and electrical wires and the like or other extremely narrow, elongated surfaces to which it would be difficult, if not impossible to install any prior art bird repellent apparatus. More specifically, a channel member is configured for receiving a large plurality of top members in a continuous serial array, wherein preferably the prongs of a plurality of top members all lie in the same or substantially the same plane. In the preferred embodiment disclosed herein, the channel member is affixed either by adhesive materials or fastening elements to a cable clamp which, in one exemplary embodiment, comprises a pair of matching C-shaped members having flanges, at least one of which can be selectively fastened by a fastener, such as a bolt or a rivet. The clamp is adapted to encircle and compressively engage a cable, such as a telephone wire or electrical wire. A plurality of such clamps are provided to engage the cable at selectively spaced intervals to firmly secure the channel member and the attendant press fit top members to the cable.

2 Claims, 2 Drawing Sheets

BIRD REPELLENT APPARATUS FOR WIRES AND THE LIKE

BACKGROUND OF THE INVENTION
FIELD OF THE INVENTION

The present invention relates generally to devices for preventing birds from landing or perching on elongated, narrow surfaces, and more specifically to a bird repellent apparatus that comprises a channel member and a pronged base member preferably made out of injection molded plastic components for simple and low cost manufacture and easy installation on virtually any elongated, narrow surface to which access to birds is to be denied Such surfaces include by way of example, telephone wires, electrical wires and the like.

PRIOR ART

The presence of birds on telephone wires, electrical wires and the like is undesireable. Bird droppings attract insects and provide a fertile bed for bacteria which can present a significant health hazard. Additionally, bird droppings on electrical wires and telephone wires can eventually interfere with the purpose of such wires by causing electrical shorts which can require costly repair and interference with normal telephone and electrical service for significant periods of time. Additionally, the unaesthetic appearance of bird droppings often requires the task of unpleasant and time consuming clean up where access to the droppings is available. Often, the repulsive appearance of bird droppings and other by products of birds is not even accessible for clean up.

The use of a plurality of pointed objects, such as spikes and the like, mounted on surfaces where it is desired to repel birds is not unknown. Until the issuance of the applicants prior patent, namely U.S. Pat. No. 5,253,444, the typical bird repellent apparatus comprised a metal base having a plurality of angularly and upwardly projecting metal wires or spikes. Unfortunately, such metal contraptions, while accomplishing the desired result, tend to be costly to manufacture because they are not conducive to non-labor intensive manufacturing processes such as injection molding for example. They also tend to be difficult to install and occasionally dangerous to install because the angularly extending wires or spikes are permanently attached to the base member, making them hazardous to the installer. Most importantly, they tend to be relatively expensive, which inherently limits their use. The disadvantages of such prior art was addressed in the applicants' prior disclosure in the aforementioned patent, relating to a bird repellent apparatus comprising a base member and a plurality of top members, each of which holds a plurality of prongs. All of the components of the applicants' prior invention can preferably be made of an injection molded plastic which can be cheaply manufactured in large numbers with virtually no significant labor costs. The use of injection molded plastics not only reduces the cost of manufacture and thus the cost to the user, but also provides the opportunity to manufacture the product in a variety of different colors, some of which may be selected to blend in with the color of the underlying surface and some of which may be purposely selected to provide an aesthetically pleasing and distinctive appearance. In any case, the applicants' prior invention provides an efficient, effective apparatus for repelling birds from surfaces- such as window sills, roof tops, boat masts, boat covers and the like, while overcoming the disadvantages of the prior art devices. However, the applicants' have found that it is difficult, if not impossible to use their prior invention in one specific and very important application, namely as a bird repellent apparatus for use on elongated wires and cables such as telephone wires, electrical wires and the like. Even though the base member of the applicants' prior invention is of an elongated relatively narrow configuration, it is nevertheless, still not properly shaded to be attached to narrow, elongated surfaces, such as cables, wires and the like. Accordingly, even with the advantageous teaching of the applicant's prior patent, there is still a need for a bird repellent apparatus which is not only easy and less costly to manufacture, but which can be readily installed on extremely narrow, elongated surfaces- such as telephone wires and electrical cables strung between poles along highways and the like for preventing the aforementioned problems associated with bird droppings.

SUMMARY OF THE INVENTION

The present invention satisfies the aforementioned continuing need to provide a bird repellent apparatus which is not only suitable, but specifically designed for installation on telephone and electrical wires and the like or other extremely narrow, elongated surfaces to which it would be difficult, if not impossible to install any prior art bird repellent apparatus including that device disclosed in the applicants' prior issued U.S. Patent. More specifically, the present invention employs the top member of the prior applicants' patent and substitutes for the base member of the prior invention, an elongated, narrow rectangular channel member for receiving the aforementioned top members in a longitudinal orientation. More specifically, a channel member is configured for receiving a large plurality of such top members in a continuous serial array, wherein preferably the prongs of a plurality of top members all lie in the same or substantially the same plane. In the preferred embodiment disclosed herein, the channel member is affixed either by adhesive materials or fastening elements to a cable clamp which, in one exemplary embodiment, comprises a pair of matching C-shaped members having flanges, at least one of which can be selectively fastened by a fastener, such as a bolt or a rivet. The clamp is adapted to encircle and compressively engage a cable, such as a telephone wire or electrical wire. A plurality of such clamps are provided to engage the cable at selectively spaced intervals to firmly secure the channel member and the attendant press fit top members to the cable in a manner disclosed herein for repelling birds. Thus, the present invention exploits the advantageous pronged top member of the applicants' prior patent, but constitutes a significant improvement thereover by supplying a novel means for securing a plurality of such top members to an elongated narrow surface, such as the exterior surface of a cable or the like.

OBJECTS OF THE INVENTION

It is therefore a principal object of the present invention to provide a bird repellent apparatus for installation on selected elongated, narrow surfaces for preventing birds from landing or perching thereon.

It is an additional object of the present invention to provide a bird repellent apparatus made entirely of low cost plastic made by injection molding and/or extrusion.

It is still an additional object of the present invention to provide a bird repellent apparatus of the type having a plurality of sharp-tipped prongs to prevent birds from landing or perching upon elongated, narrow surfaces such as cables and the like, the apparatus having a channel member for attachment to the cable and a plurality of prong holding members to enable simple and safe installation.

It is still an additional object of the present invention to provide a bird repellent apparatus comprising an injection molded or extruded plastic channel member having an elongated configuration of selected length adapted for attachment to a cable and the like and a plurality of injection molded plastic top members, each such top member having a prong holder and a plurality of sharp-tipped prongs, those top members being adapted for being press fit into the channel member after installation of the channel member on an elongated, narrow surface such as a telephone wire or the like.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
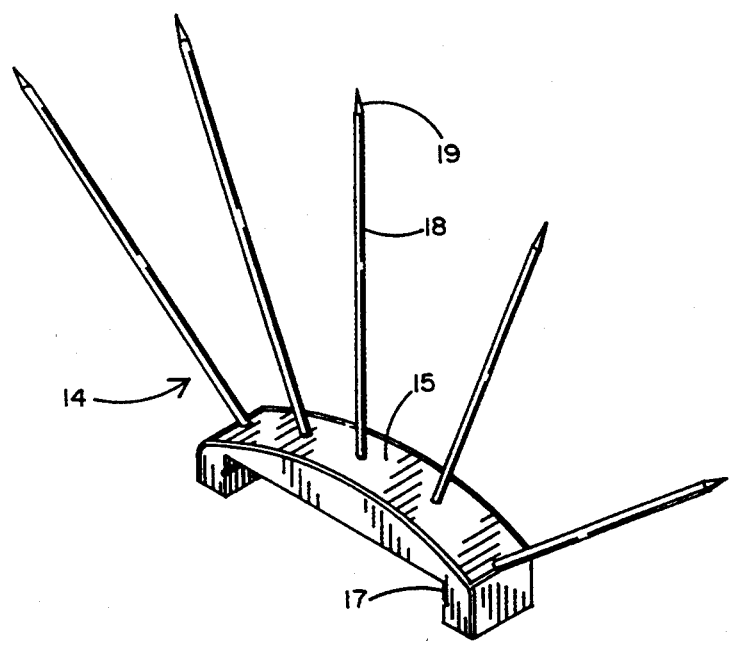
FIG. 1 is a three-dimensional illustration of a prior art top member employed in the present invention.

Referring to FIG. 1, it will be seen that the top member 14 of the present invention comprises a prong base 15 and a plurality of prongs 18, each prong terminating in a sharpened tip 19. Prong base 15 terminates in a pair of leg members 17 which, in the prior art patent, 5,253,444, are designed to span the lateral expanse of a base member, which is not used in the present invention. However, as will be seen hereinafter, the legs 17 provide a means for press fit engagement of the top member 14 with the channel member of the present invention.

Figure 2:
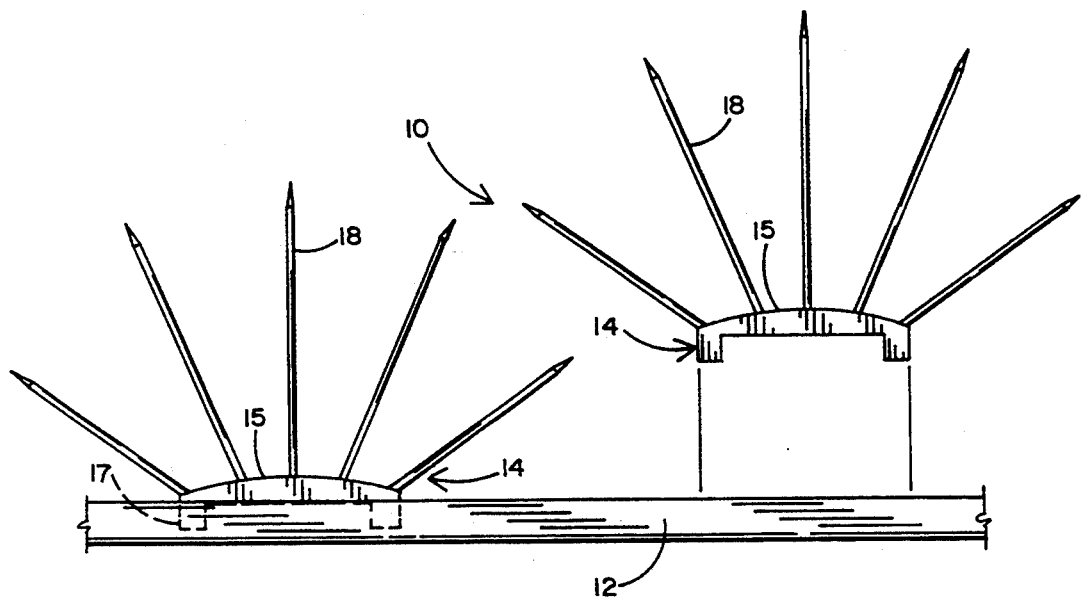
FIG. 2 is an elevational view of the present invention showing two top members and the channel member thereof, with one such top member installed and the other top member in a position to be installed in the channel member.
Figure 3:
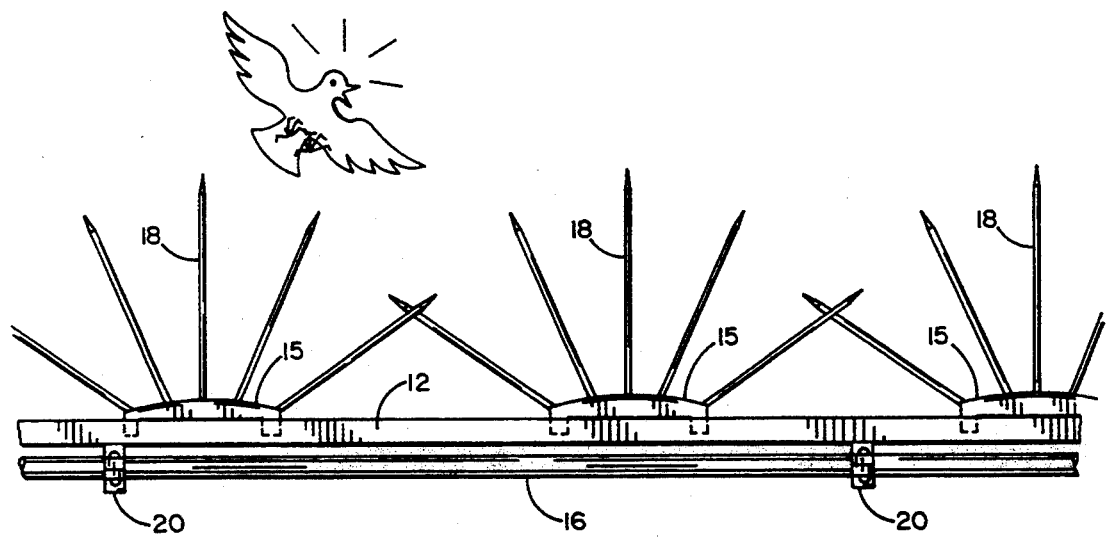
FIG. 3 is a view similar to that of FIG. 2, but illustrating a plurality of top members fully installed in the underlying channel member and the combined top members and channel member attached by means of clamps to an elongated cable.
Figure 4:
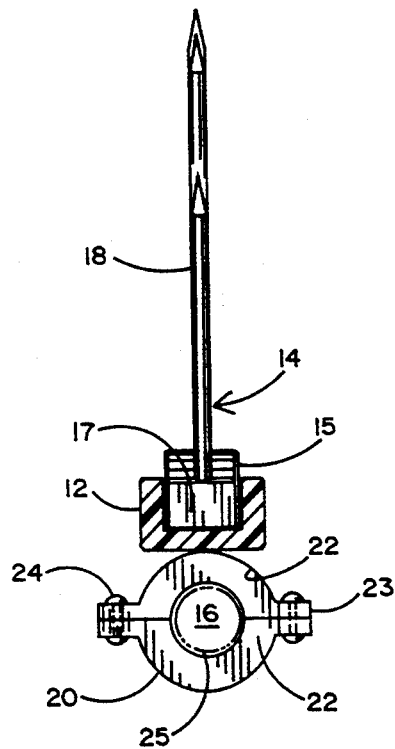
FIG. 4 is a partially cross-sectioned end view of the bird repellent apparatus of the present invention.

Referring now to FIGS. 2 through 4, it will be seen that in the present invention, top member 14 is press fit in a longitudinal configuration in a channel member 12, the rectangular cross section of which is shown best in FIG. 4. As seen best in FIGS. 2 and 3, in the preferred embodiment of the present invention, a plurality of top members 14 are press fit into the channel member 12 in a serial, longitudinally arrayed configuration. The press fit engagement between the legs 17 of top member 14 and the channel member 12 may be understood best by reference to FIG. 4 which shows the channel member 12 in cross section with a top member 14 installed therein, in press fit engagement with the interior surface of the channel member. As also seen in FIGS. 3 and 4, the channel member 12 has connected to it, by either an adhesive or fastening element, a plurality of clamps 20. As seen in FIG. 4, such clamps may comprise a pair of C-shaped members 22, having mating flanges 23 which are interconnected by a plurality of fasteners 24, such as bolts or rivets or the like.

The two C-shaped members 22 have a semi-circular formed interior which, when joined in the manner shown in FIG. 4, form a circular aperture 25. Aperture 25 is adapted to engage the exterior circular surface of the cable or wire 16. Although the relative positions of the plurality of top members 14 and the underlying channel member 12 may be selected in accordance with the desires of the installer, a preferred relationship is that shown in FIG. 3. More specifically, the respective prongs 18 of each top member 14 slightly overlap one to the next in serial relation, so that there are no gaps between the respective prongs of the plurality of top members. Such gaps would otherwise permit a bird to land or perch on the underlying channel member 12, which would thus reduce the bird repellent advantage of the present invention. Furthermore, it will be seen that the combination of top members 14 and channel member 12 is preferably connected to the underlying wire or cable 16, so that the prongs 18 are pointed in an upwardly directed or vertical direction, relative to the wire or cable 16. A horizontal or diagonally oriented direction would still permit the bird to land on either the cable 16 or the channel 12 and thus defeat the primary advantage of the present invention.

It will now be understood that what has been disclosed herein, is a bird repellent apparatus comprising a channel member and a plurality of top members each such top member providing a prong base and a plurality of pointed tipped prongs, extending from the upper surface of the top member at various angles to prevent birds from landing or perching thereon. Furthermore, it will be understood that the present invention is an improvement over the applicants' previously issued U.S. Pat. No. 5,253,444 which improvement provides a unique, longitudinal relationship between a plurality of top members which are serially configured and arranged in a longitudinal configuration. Such a configuration is far more suitable than the applicants' prior invention for installation on elongated, narrow surfaces, such as telephone wires, electrical cables and the like. Furthermore, it will be seen that the present invention is designed to be attached to such cables and wires and the like by means of a plurality of cable clamps which are attached to the underlying surface of the channel member at selectively spaced intervals to provide a means for attaching the channel member and the press fit top members to the upwardly facing surface of such cables and wires to prevent birds from landing or perching on such wires.

Those having skill in the art to which the present invention pertains, will now as a result of the applicants' teaching perceive various modifications and additions which may be made to the invention. By way of example, the specific materials, dimensions, and shapes disclosed herein may be readily altered without deviating from the basic teaching of the invention. Furthermore, the specific configuration of the clamp designed to attach the channel member and top members to an underlying cable or wire as shown herein, may be readily altered or replaced by differently configured clamps which are also designed to attach to a cable or wire, such as, for example, a metal hose clamp or plastic ring-shaped device. Accordingly, all such modifications and additions are deemed to be within the scope of the invention which is to be limited only by the claims appended hereto and their equivalents.

We claim:

1. A bird repellent device for use on narrow, elongated surfaces including wires, cables and poles; the device comprising:

a plurality of probe members each having a planar array of elongated probes terminating in a sharpened point;

an elongated channel member having an axis and an interior surface receiving said plurality of probe members in a serial array along said axis; and means for connecting said channel member to at least one said elongated surface;

wherein each said probe member comprises a probe base having an arcuate upper surface from which said probes respectively extend in different relative directions and having at least one leg member; and wherein said channel member has an interior surface shaped to receive said leg member in press-fit engagement therewith.

2. A bird repellent device for use on electrical-signal-carrying wire strung substantially horizontal between spaced vertical poles; the device comprising:

an elongated channel member having means for attachment to said wire substantially parallel thereto; and a plurality of probe members arranged in a serial array within said channel member, each said probe member having at least one extending probe terminating in a pointed end and directed from said channel member in a direction substantially opposite said wire attachment means;

wherein each said probe member comprises a probe base having an arcuate upper surface from which said probes respectively extend in different relative directions and having at least one leg member; and wherein said channel member has an interior surface shaped to receive said leg member in press-fit engagement therewith.

* * * * *